United States Patent
Gallagher et al.

(10) Patent No.: US 12,424,677 B2
(45) Date of Patent: Sep. 23, 2025

(54) BATTERY CELL ASSEMBLY, BATTERY, AND MOTOR VEHICLE

(71) Applicant: Bayerische Motoren Werke Aktiengesellschaft, Munich (DE)

(72) Inventors: Kevin Gallagher, Naperville, IL (US); Frederik Morgenstern, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 623 days.

(21) Appl. No.: 17/785,117

(22) PCT Filed: Jan. 25, 2021

(86) PCT No.: PCT/EP2021/051564
§ 371 (c)(1),
(2) Date: Jun. 14, 2022

(87) PCT Pub. No.: WO2021/164985
PCT Pub. Date: Aug. 26, 2021

(65) Prior Publication Data
US 2023/0019895 A1  Jan. 19, 2023

(30) Foreign Application Priority Data
Feb. 21, 2020  (DE) .................. 10 2020 104 573.5

(51) Int. Cl.
*H01M 10/00* (2006.01)
*H01M 10/613* (2014.01)
(Continued)

(52) U.S. Cl.
CPC ....... *H01M 10/653* (2015.04); *H01M 10/613* (2015.04); *H01M 10/625* (2015.04);
(Continued)

(58) Field of Classification Search
CPC .. H01M 50/521; H01M 50/213; H01M 50/51; H01M 10/653; H01M 10/625; H01M 2200/00; H01M 220/20; Y02E 60/10
See application file for complete search history.

(56) References Cited

U.S. PATENT DOCUMENTS

| | | |
|---|---|---|
| 2012/0021260 A1 | 1/2012 | Yasui et al. |
| 2012/0082887 A1* | 4/2012 | Ninomiya ............. H01G 11/10 361/434 |

(Continued)

FOREIGN PATENT DOCUMENTS

| | | |
|---|---|---|
| CN | 101606210 A | 12/2009 |
| CN | 102074770 A | 5/2011 |

(Continued)

OTHER PUBLICATIONS

Diao et al., Battery Module And Its Preparation Method And Battery Pack, Feb. 2017, See the Abstract. (Year: 2017).*

(Continued)

*Primary Examiner* — Anca Eoff
*Assistant Examiner* — Monique M Wills
(74) *Attorney, Agent, or Firm* — Crowell & Moring LLP

(57) ABSTRACT

A battery cell assembly includes a frame and multiple battery cells which are held in cell-individual recesses of the frame so as to be aligned parallel to one another. A respective gap filler is arranged between lateral surfaces of the battery cells and the recess inner faces facing the lateral surfaces, said gap filler connecting the battery cells and the frame together. The frame is made of a solid, dimensionally stable, and thermally conductive material, and the gap filler is made of a permanently deformable thermally conductive material. Furthermore, the inner faces of the recesses extend in the vertical direction of the battery cells over the entire length thereof.

14 Claims, 2 Drawing Sheets

(51) Int. Cl.
*H01M 10/625* (2014.01)
*H01M 10/643* (2014.01)
*H01M 10/653* (2014.01)
*H01M 50/213* (2021.01)
*H01M 50/249* (2021.01)
*H01M 50/271* (2021.01)
*H01M 50/289* (2021.01)
*H01M 50/51* (2021.01)

(52) U.S. Cl.
CPC ....... *H01M 10/643* (2015.04); *H01M 50/213* (2021.01); *H01M 50/249* (2021.01); *H01M 50/271* (2021.01); *H01M 50/289* (2021.01); *H01M 50/51* (2021.01); *H01M 2220/20* (2013.01)

(56) References Cited

U.S. PATENT DOCUMENTS

2013/0209858 A1  8/2013  Schmitt et al.
2018/0366794 A1  12/2018  Kim et al.

FOREIGN PATENT DOCUMENTS

| CN | 102986082 A | 3/2013 | | |
|---|---|---|---|---|
| CN | 203491315 U | 3/2014 | | |
| CN | 104241582 A | 12/2014 | | |
| CN | 106450119 A | * | 2/2017 | |
| CN | 206992188 U | 2/2018 | | |
| CN | 108475832 A | 8/2018 | | |
| CN | 110391481 A | 10/2019 | | |
| DE | 10 2009 035 487 A1 | 2/2011 | | |
| DE | 10 2014 209 444 A1 | 11/2015 | | |
| DE | 102017002155 A1 | * | 9/2018 | ....... B29C 45/14336 |
| EP | 3 382 791 A1 | 10/2018 | | |
| WO | WO 2011/101391 A1 | 8/2011 | | |
| WO | WO 2012/044934 A1 | 4/2012 | | |
| WO | WO 2016/139038 A1 | 9/2016 | | |

OTHER PUBLICATIONS

Rausch, Sub-shell Constructed Of Plate Elements For A Battery Case And Traction Battery For A Motor Vehicle, Sep. 2018, See the Abstract. (Year: 2018).*
International Search Report (PCT/ISA/210) issued in PCT Application No. PCT/EP2021/051564 dated Mar. 31, 2021 with English translation (four (4) pages).
German-language Written Opinion (PCT/ISA/237) issued in PCT Application No. PCT/EP2021/051564 dated Mar. 31, 2021 (seven (7) pages).
German-language Office Action issued in German Application No. 10 2020 104 573.5 dated Jan. 19, 2021 (three (3) pages).
German-language Office Action issued in German Application No. 10 2020 104 573.5 dated Oct. 14, 2020 (five (5) pages).
German-language Decision to Grant issued in German Application No. 10 2020 104 573.5 dated Jun. 24, 2021 (four (4) pages).
Cover page of EP 2 537 204 A1 published Dec. 26, 2021 (one (1) page).
Chinese-language Office Action issued in Chinese Application No. 202180006636.5 dated Jun. 20, 2025 with English translation (22 pages).

* cited by examiner

BATTERY CELL ASSEMBLY, BATTERY, AND MOTOR VEHICLE

BACKGROUND AND SUMMARY OF THE INVENTION

The present invention relates to a battery cell assembly, to a battery comprising at least one such battery cell assembly, and to a motor vehicle comprising such a battery.

Batteries of different types have already been used for a long time in a very wide variety of technical fields and for a very wide range of applications. However, continually increasing demands are being placed on the batteries, for example in respect of a capacity, a charging and discharging rate, an output power, production costs and the range of environmental conditions in which operation is permissible. In order to meet these demands, temperature or heat management is required in a large number of batteries or in a large number of applications. Particularly in batteries which are composed of a large number of individual battery cells, such as traction batteries for vehicles for example, adequate heat dissipation or cooling is primarily required in order to prevent overheating of the battery during operation.

By way of example, DE 10 2009 035 487 A1 discloses a battery in which a plurality of individual cells which are arranged in parallel are situated on a thermally conductive plate in a thermally conductive manner. Here, provision is further made for the individual cells to be arranged at an end which faces away from the thermally conductive plate in cutouts in a manner projecting through a holding plate. Here, a supporting element which is formed from a curing material is at least partially introduced into an intermediate space which is formed between a respective individual cell and the cutout. One disadvantage of such an arrangement can be, for example, that, depending on the power or loading of the battery, heat can be dissipated from the individual cells only via a relatively small surface area and a temperature gradient can be produced between the opposite ends of the individual cells during operation.

CN 101 606 210 A discloses an energy storage unit in which a large number of individual storage elements are accommodated by a housing composed of a thermally conductive resin. Here, the housing is of two-part design and encloses a lower end and an upper end of the individual storage elements.

As a further example, WO 2016/139 038 A1 discloses a battery comprising a plurality of battery cells which are electrically interconnected with one another. Here, a respective module has a receiving container in which a plurality of individual battery cells are arranged next to one another with at least one spacing which creates an intermediate space, and the intermediate space is filled with electrically insulating balls. Owing to the shape of the balls and depending on the degree of filling, optimum heat dissipation from the individual battery cells is not reliably ensured here either.

The object of the present invention is to improve heat management of a battery with a particularly simple design. This object is achieved by the claimed invention.

The battery cell assembly according to an embodiment of the invention comprises a frame and a plurality of battery cells. The battery cells each have two end sides which are situated opposite one another in a vertical direction of the battery cells and are connected by at least one lateral surface which extends in the vertical direction. The lateral surface can therefore be or form, for example, at least one side wall of the battery cells. The individual battery cells are held in cell-specific recesses of the frame with vertical directions which are oriented at least substantially parallel to one another. The frame can therefore accordingly also be referred to as a cell holder. A respective gap filler, which connects the battery cells and the frame to one another, is arranged between the lateral surfaces and inner sides of the recesses, which inner sides face the lateral surfaces. Here, the gap filler therefore at least partially surrounds the individual battery cells, and, in each of the battery cells, at least partially fills a spacing between the lateral surface of the battery cells and the surrounding inner wall of the recess. The gap filler therefore constitutes or produces, in particular perpendicularly to the vertical direction, a continuous mechanical connection or material connection between the respective battery cell and the frame.

According to an embodiment of the invention, the frame is formed from a solid, dimensionally stable and thermally conductive material for controlling the temperature of the battery cells, that is to say for supplying heat to the battery cells or dissipating heat from the battery cells depending on the situation. The frame is therefore rigid or stiff and not deformable at least under normal conditions. Therefore, the frame provides mechanical stability and structure of the battery cell assembly. The frame can in particular be of one-piece design here, that is to say can be designed as a monolithic structural part in which the recesses are arranged in a distributed manner and spaced apart from one another.

According to an embodiment of the invention, provision is further made for the inner sides of the recesses to extend at least substantially over an entire length of the lateral surfaces of the battery cells in the vertical direction. In other words, the frame surrounds the battery cells at least in the vertical direction of the battery cells, that is to say continuously and at least virtually completely. A height or extent of the frame in the vertical direction can preferably correspond overall at least substantially to the length of the lateral surfaces in the vertical direction or a height of the battery cells which is measured in this direction. Here, the recesses can completely or only partially pass through the frame in the vertical direction. The recesses can therefore be open at the end sides of the battery cells accommodated in them or closed or covered at one or both sides.

According to the invention, provision is further made for the gap filler to be formed from a permanently deformable thermally conductive material. The material of the gap filler can therefore be permanently soft or elastic or flexible, that is to say in particular non-curing, under normal conditions in particular. This can therefore be the case at least at room temperature and a pressure of 1 bar. The gap filler can therefore be, for example, a thermally conductive elastomer or gel or a thermally conductive paste or the like. Here, the spacing between one of the lateral surfaces and the inner side of the respective recess, which inner side surrounds the lateral surfaces, can be so low and a viscosity or flowability of the material of the gap filler can be so low that the gap filler also does not readily run out of the recess in the case of recesses which are open on both sides. The spacing between one of the lateral surfaces and the respective inner side of the respective recess, which inner side faces the lateral surfaces, can preferably be, for example, less than 5 mm, preferably less than 2 mm. However, depending on the material specifically used as gap filler, the recesses can be closed or covered, as described, for example on one side or on both sides in order to prevent the gap filler from running out. In order to achieve particularly reliable holding and fitting of the gap filler and particularly reliable connection of the gap filler to the frame and to the respective battery cell, the gap filler can preferably be a thermally conductive adhesive. In another variant, the gap filler can be, for example, a resin, for example an epoxy resin or the like. As a result, a stiffer connection with the frame can be established as required. In general, the gap filler can be a gap filler material.

In every case, owing to the permanent deformability of the gap filler, unevennesses or manufacturing tolerances both of the recesses and also of the battery cells can advantageously be compensated for and therefore reliable contact between the battery cells and the frame can always be ensured. Therefore, particularly effective and particularly reliable and uniform transfer of heat between the battery cells and the frame can advantageously be rendered possible. Owing to the configuration proposed here, an advantageously particularly large heat transfer area is additionally provided for each battery cell. Therefore, not only can a particularly large amount of heat be dissipated from the battery cells or supplied to the battery cells, but also production of a temperature gradient over the length, that is to say along the vertical direction of the battery cells, can additionally be avoided. This is advantageously achieved by way of a particularly simple design since the frame performs a double functionality, specifically both providing a mechanical structure and stabilization and also conducting heat to or from the battery cells or the gap filler which surrounds the battery cells. Here, the gap filler, on account of its permanent deformability, can advantageously reduce the demands placed on the other structural parts or components of the battery cell assembly in respect of manufacturing or accuracy and thereby further reduce expenditure on manufacturing the battery cell assembly.

The battery cells can particularly preferably be cylindrical cells, such as the types 18650 or 21700 or the like which are common at the present time, for example. In this case, the lateral surfaces are therefore cylindrical surfaces with an at least substantially round cross section. This has the advantage that the recesses can be shaped in a particularly simple manner, for example as simple bores in the frame. However, an embodiment of the present invention can likewise be used for battery cells shaped in a different way, for example for prismatic cells or what are known as pouch cells. In these cases, the recesses can be accordingly differently shaped, but still matched to the shape and size of the battery cells. Specifically when pouch cells are used, the use of the permanently deformable gap filler is particularly advantageous since, owing to this gap filler, typical deformation or change in size of the pouch cells during operation of the battery cell assembly can be intercepted and compensated for. When non-cylindrical battery cells of this kind are used, the lateral surfaces can be formed by correspondingly free-form surfaces or, for example, by a plurality of side faces of the battery cells.

A further advantage of an embodiment of the present invention is that, in comparison to batteries with immersion cooling of the individual battery cells, a high level of expenditure on sealing which is required there and a corresponding pump mechanism for a liquid immersion or cooling medium can be dispensed with.

A thermally conductive plate can preferably additionally be provided on at least one side of the frame. For example, the battery cell assembly can be situated on such a thermally conductive plate and can be at least partially surrounded or enclosed by a plurality of such thermally conductive plates. At least one such thermally conductive plate can likewise be part of the battery cell assembly. In particular, a plane of main extent of at least one thermally conductive plate can be arranged at least substantially perpendicularly to the vertical direction, that is to say parallel to the end faces. Here, the thermally conductive plate can be arranged in thermally conductive direct or indirect contact with an end side of the battery cells and/or with a top side or bottom side of the frame. For example, a liquid heat transmission medium, in particular a cooling medium, can flow through the at least one thermally conductive plate. For example, the thermally conductive plate can be designed to be connected to a cooling circuit of the vehicle when arranged in a vehicle as intended. Such a thermally conductive plate or arrangement can advantageously particularly effectively pass on or dissipate the heat dissipated from the battery cells via the frame to a surrounding area.

In an advantageous development of the present invention, the gap filler is formed from a material whose thermal conductivity decreases as the temperature increases. This can be achieved, for example, by a corresponding inherent material property or by a phase transition of the material of the gap filler. A material selection of this kind can advantageously counteract, slow down or limit the effects of thermal runaway.

In a further advantageous refinement of the present invention, the recesses are closed by cover elements on both sides in the vertical direction, and the gap filler is formed from a material with an evaporation or boiling temperature of between 80° C. and 120° C. Here, the cover elements can be part of the frame, that is to say for example manufactured from the same material as the frame. The cover elements can likewise be separate structural parts. The cover elements can particularly preferably have encircling seals. Owing to the cover elements, the gap filler can advantageously be prevented from leaking from the recesses at temperatures above the evaporation temperature of the gap filler. In this way, it is possible to prevent or reduce—at least in the case of brief—overshooting of the evaporation temperature, transmission of heat to the respective battery cell or from the respective battery cell to other battery cells, as a result of which thermal runaway of the battery cell assembly can be entirely prevented or slowed down. Pressure stability of the cover can preferably be lower than pressure stability of the frame or a remaining portion of the frame. As a result, when the evaporation temperature of the gap filler is exceeded, at least one of the cover elements can be deliberately raised or destroyed by the pressure prevailing in the respective recess and therefore unpredictable destruction of the frame or a remaining portion of the frame can be avoided. Similarly, the cover elements can be formed, for example, from a partially gas-permeable membrane in order to prevent or limit a build-up of excess pressure in the recesses.

In a further advantageous refinement of the present invention, a respective first electrical pole of the battery cells is arranged at one of the end sides. The gap filler and the frame are further then formed from an electrically conductive material, and a respective second electrical pole of each battery cell is electrically contacted by the gap filler. The second electrical pole of the battery can therefore be connected to the lateral surface or formed by the lateral surface. This advantageously renders possible particularly good electrical contact, wherein an additional contact element for contacting the second electrical pole of each battery cell can additionally advantageously be saved. Instead, for example, electrical power supply or contacting of the second poles of the battery cells can be realized via the frame and therefore at a flexibly selectable point. This can advantageously not only reduce the expenditure on manufacturing the battery cell assembly, but rather advantageously also create additional design freedom in respect of a shape or in respect of installation space requirements of the battery cell assembly. The end side, at which the first electrical pole of the respective battery cell is arranged, can of course be free of the gap filler here in order to prevent a short circuit. In the manner described here, the second electrical pole or a corresponding electrical contact can be designed with a particularly large surface area, as a result of which a local current density can advantageously be reduced and therefore spot heating as well as an electrical resistance of the electrical contacting of the second poles of the battery cells can be reduced.

In an advantageous development of the present invention, the battery cell assembly has a first cell block and a second cell block which are each composed of a plurality of battery cells. The first electrical poles of each cell block are electrically connected to one another by way of a respective cell connector here. Each cell block additionally has a respective dedicated frame in which the battery cells of this cell block are accommodated. Here, the frames of the cell blocks are spaced apart from one another by an electrical insulator. The cell connector of the first cell block is electrically connected to the frame of the second cell block via a connecting line, so that the cell blocks are electrically interconnected with one another in series, that is to say are arranged in series. In this way, a battery cell assembly can advantageously be realized with a total voltage or output voltage which is higher than a voltage or output voltage of each individual battery cell. In the present case, this can be realized in a particularly simple manner, that is to say for example with a particularly low level of expenditure on manufacture, and at the same time with a particularly high degree of flexibility in terms of design since the connecting line can be connected to different points of the frame of the second cell block depending on the available installation space and conditions. Similarly, the battery cell assembly can have further cell blocks, wherein the cell blocks can all be connected to one another or interconnected purely in series or at least partially in parallel. A specific refinement can be dependent on a respective application or respective requirement here for example.

In a further advantageous refinement of the present invention, the gap filler is formed from an electrically insulating material. The battery cells can therefore be electrically insulated from the frame by the gap filler here. This advantageously creates additional freedom in terms of design for selecting a material of the frame. For example, the frame can then be manufactured from an electrically conductive material, as a result of which a particularly good thermal conductivity and therefore correspondingly particularly good and reliable temperature control of the battery cells can advantageously typically be achieved.

In a further advantageous refinement of the present invention, a plurality of dimensionally stable, preferably thermally conductive, spacers are arranged between each of the battery cells and the inner wall of the respective recess, which inner wall surrounds the battery cells. Here, the spacers are arranged in a manner distributed in the circumferential direction of the respective battery cell and are spaced apart from one another by regions which are filled with the gap filler. When cylindrical battery cells are used, the spacers can therefore be arranged in a manner distributed along the circumference of each battery cell on the lateral surface of the battery cell. When other or differently shaped battery cells are used, the spacers can be arranged on different sides of the battery cell for example. When cylindrical battery cells are used, at least three, preferably at least four, spacers can be provided, wherein two arbitrary adjacent spacers should be spaced apart from one another by less than 180° in the circumferential direction.

When non-cylindrical battery cells are used, at least one spacer can preferably be arranged on each side of the battery cell. As a result, just like owing to the stiffness or deformation resistance of the spacers, centered orientation of the battery cells in the recesses can advantageously be particularly reliably achieved or the battery cells can be fixed in the recesses in spite of the deformability of the gap filler. In particular, owing to the spacers, a relative movement between the battery cells and the frame or undershooting of a minimum spacing between the battery cells and the frame can therefore be avoided. In addition, owing to the spacers, displacement or flow of the gap filler in the circumferential direction can advantageously be prevented or reduced. Provision can particularly preferably be made for an extent of the spacers in the circumferential direction to be small overall in comparison to a total circumference of the respective battery cell or recess, for example at most 25%, preferably at most 15%. As a result, contact between the gap filler and the battery cells with as large a surface area as possible and as a result a particularly homogeneous temperature of the battery cells can advantageously be ensured. The spacers can advantageously extend over at least substantially the entire length of the recesses or the lateral surfaces in the vertical direction. The spacers can therefore be of at least substantially rod-like design. This can advantageously simplify manufacture of the battery cell assembly. However, similarly, the spacers can be designed to be shorter or, for example, have multiple parts or be interrupted in the vertical direction. As a result, a portion of the lateral surface which is contacted by the gap filler can advantageously be increased in size.

In an advantageous development of the present invention, the spacers are formed from an electrically conductive material and contact an electrical pole of the respective battery cell. This electrical pole can be, in particular, the described second electrical pole. The spacers can be, for example, the described contacting device or part of this contacting device. By way of example, the spacers or, for example, one spacer per battery cell can be extended beyond the battery cell or beyond the respective recess in the vertical direction. This can advantageously render possible particularly simple electrical contacting of the spacers or the battery cells. Owing to the configuration of the spacers proposed here, the spacers can advantageously fulfill a double functionality, specifically firstly as mechanical spacers and secondly as electrical contact elements for contacting the battery cells. As a result, expenditure on structural elements and complexity of the battery cell assembly can advantageously be reduced. Depending on the configuration of the battery cell assembly, provision can be made, for example, for the frame to be formed from an electrically insulating or non-conductive material and/or for the inner sides or inner walls of the recesses to be coated with an electrically insulating material. As a result, individual contacting and therefore particularly flexible interconnection of the battery cells with one another can advantageously be realized.

A further aspect of the present invention is a battery which comprises a housing and at least one battery cell assembly which is arranged in the housing. The battery according to an embodiment of the invention can be, in particular, a traction battery for a motor vehicle. Furthermore, the battery according to an embodiment of the invention can have further components or structural parts, for example an electronics system, a controller, a safety device and/or the like.

A further aspect of the present invention is a motor vehicle which has at least one battery according to the invention. Here, the battery can preferably be a traction battery of the motor vehicle according to an embodiment of the invention.

Further features of the invention can emerge from the claims, the figures and the description of the figures. The features and combinations of features mentioned above in the description and the features and combinations of features mentioned in the description of the figures below and/or shown solely in the figures can be used not only in the respectively indicated combination but also in other combinations or else on their own, without departing from the scope of the invention.

DETAILED DESCRIPTION OF THE DRAWINGS

Identical and functionally identical elements are provided with the same reference signs in the figures.

It is known that batteries or rechargeable battery cells generate heat when subjected to loading and therefore cooling is often required in order to achieve stable and safe operation. With conventional designs of batteries or rechargeable batteries with a plurality of individual cells, a cell intermediate space is often largely thermally insulating and either air-filled or filled with a thermally insulating material. Therefore, typically only a small portion of the total surface of the individual cells is disadvantageously available for dissipating heat. In alternative designs, the cell intermediate space is flooded with a thermally conductive and electrically insulating liquid, this potentially resulting in a high level of expenditure for sealing. In addition, provision of suitable corresponding immersion coolant is greatly limited since such a coolant should not be combustible, has to have a high thermal conductivity, has to be electrically insulating and must not cause corrosion of the individual cells.

Figure 1:
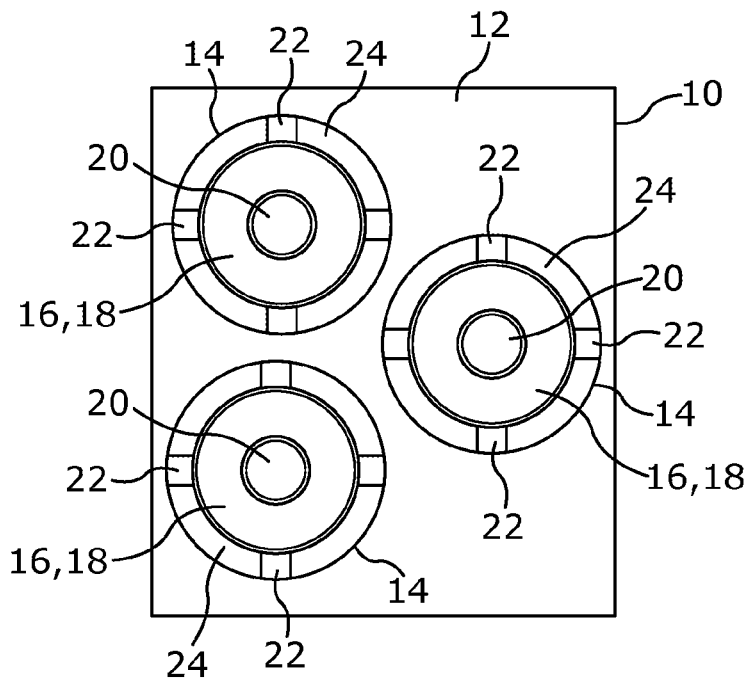
FIG. 1 shows a schematic plan view of a detail of a battery cell assembly.

Against this background, FIG. 1 shows a schematic plan view of a detail of a battery cell assembly 10 with improved heat management. Here, the battery cell assembly 10 has a frame 12 which functions as a cell holder and has a plurality of recesses 14. A battery cell 16 of the battery cell assembly 10 is accommodated in each of the recesses 14. Here, the battery cells 16 are cylindrical cells with a cylindrical lateral surface which connects an end side 18, shown here, to an opposite second end side. In the present case, a first pole 20 for electrically contacting the battery cells 16 is arranged at each end side 18 of the battery cells 16.

In the present case, the recesses 14, in the radial direction of the battery cells 16, are larger than the battery cells, that is to say have a larger diameter than the battery cells 16. As a result, there is in each case a spacing between one of the battery cells 16 and an inner side or inner wall of the respective recess 14, which inner side or inner wall faces the battery cells. Here, a plurality of spacers 22 are arranged in this spacing, the battery cells 16 being centered and fixed in the respective recess 14 by the spacers. A remainder of the spacing remaining between the spacers 22, that is to say a portion of the recesses 14 which is not filled either by the spacers 22 or by the battery cells 16, is here filled by a gap filler 24 composed of a permanently deformable, that is to say non-curing, thermally conductive material, for example a cooling gel or a thermally conductive paste.

Heat can be conducted from the battery cells 16 into the frame 12 by the gap filler 24. Here, the frame 12 is likewise manufactured from a thermally conductive but solid or dimensionally stable material.

Figure 2:
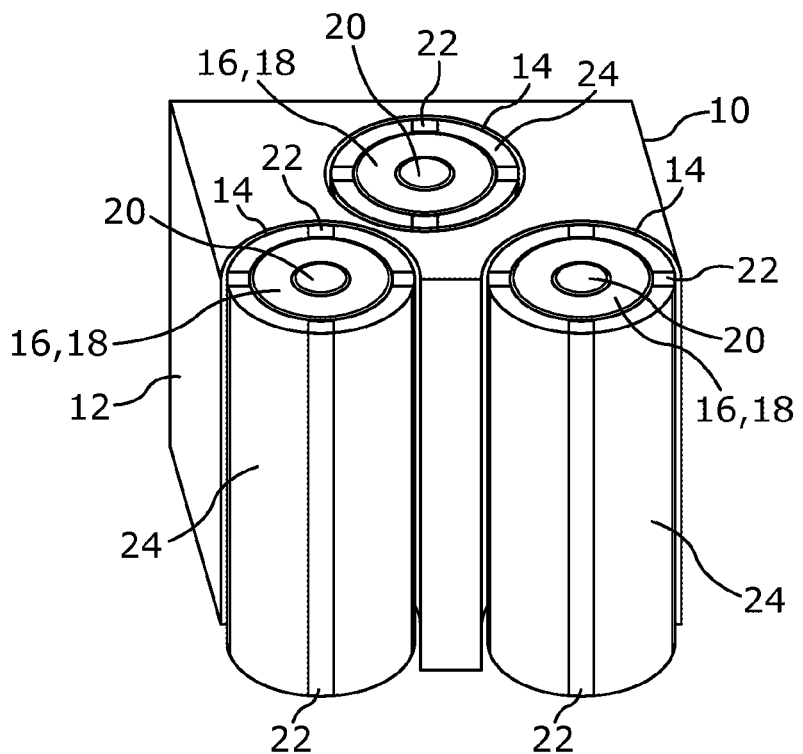
FIG. 2 shows a schematic, partially sectioned perspective view of the battery cell assembly.

For better illustration, FIG. 2 shows a schematic, partially sectioned perspective view of a detail of the battery cell assembly 10. It can be seen here that the recesses 14 at least substantially completely pass through the frame 12 in a direction of vertical or longitudinal extent of the battery cells 16. Similarly, the spacers 22 extend at least substantially over the entire height of the recesses 14 or the battery cells 16.

A basic principle of the battery cell assembly 10 therefore lies in the use of a thermally conductive and solid or mechanically stable material for the frame 12 and a honeycomb-like structure of the frame 12 into which the battery cells 16 are inserted. Here, the frame 12 can be of electrically conductive configuration, for example composed of aluminum or copper or the like, or electrically insulating configuration, for example composed of aluminum oxide, aluminum nitrite or aluminum with an insulation coating or the like. Here, the gap filler 24 renders possible particularly effective heat exchange between the battery cells 16 and the frame 12 over a large surface area. The gap filler 24 can likewise be electrically conductive or electrically insulating, depending on the configuration.

Figure 3:
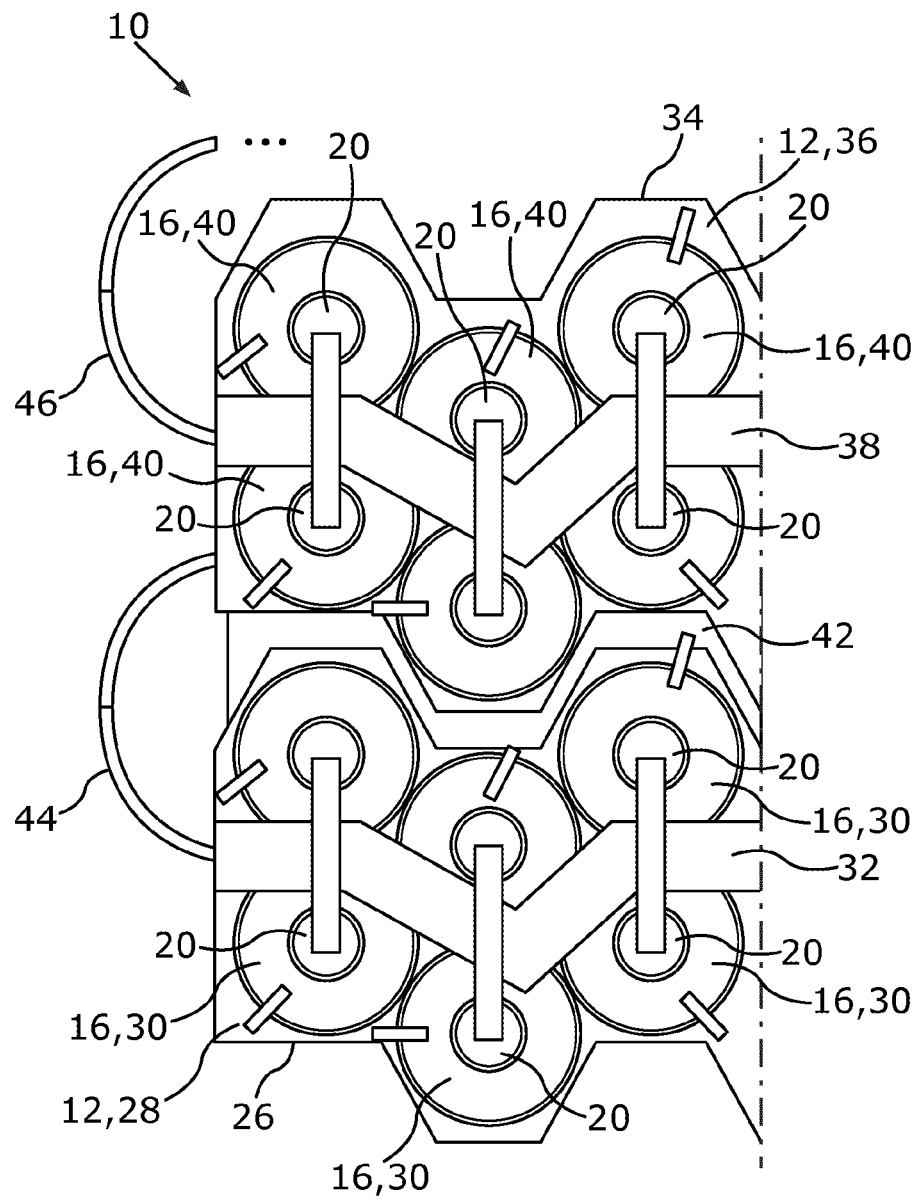
FIG. 3 shows a schematic plan view of a detail of a battery cell assembly with a plurality of cell blocks.

FIG. 3 shows a further schematic plan view of a detail of a battery cell assembly 10 which comprises a plurality of cell blocks here. Specifically, a first cell block 26 with a first frame 28 and battery cells 16 accommodated in the frame, which battery cells form a first cell combination 30, is illustrated here by way of example. Here, the battery cells 16 are connected to one another by a first cell connector 32, which electrically connects the first poles 20 of the battery cells 16 of the first cell block 26 to one another, to form the first cell combination 30. Here, a second cell block 34, which is constructed analogously to the first cell block 26, is illustrated spaced apart from the first cell block 26. The second cell block 34 accordingly has a dedicated second frame 36 and a plurality of battery cells 16, the first poles 20 of the battery cells being electrically connected to one another by a second cell connector 38 to form a second cell combination 40.

For reasons of clarity, only some of the battery cells 16 and the first poles 20 are identified here.

The first cell block 26 and the second cell block 34 are spaced apart from one another by an electrical insulator 42 here.

Here, the first cell connector 32 is electrically connected to the second frame 36 via a connecting line 44. Here, the frames 28, 36 are of electrically conductive design and, by way of the respective gap fillers 24, not shown here, establish electrical contact with the respective other second poles, that is to say second poles which are different from the first poles, of the battery cells 16 of the respective cell combination 30, 40. Here, the first cell block 26 and the second cell block 34 and therefore the cell combinations 30, 40 of the cell blocks are electrically connected to one another in series via the connecting line 44. An assembly of this kind of cell blocks which are electrically connected to one another can be extended in series and/or in parallel substantially as desired. This is indicated here by a further connecting line 46 starting from the second cell connector 38.

Each cell block 26, 34 can form, for example, a module of a broader battery. Similarly, a plurality of cell blocks 26, 34 can be combined to form a module of the larger battery or to form the battery itself.

LIST OF REFERENCE SIGNS

10 Battery cell assembly
12 Frame
14 Recesses
16 Battery cells
18 End side
20 First pole
22 Spacer
24 Gap filler
26 First cell block
28 First frame
30 First cell combination
32 First cell connector
34 Second cell block
36 Second frame
38 Second cell connector
40 Second cell combination
42 Insulator
44 Connecting line
46 Further connecting line

The invention claimed is:

1. A battery cell assembly, comprising:
a frame; and
a plurality of battery cells, each of which has two end sides which are situated opposite one another in a vertical direction and are connected by at least one lateral surface which extends in the vertical direction, wherein:
the battery cells are held in cell-specific recesses of the frame with vertical directions which are oriented at least substantially parallel to one another,
a respective gap filler, which connects the battery cells and the frame to one another, is arranged between the lateral surfaces and the inner sides of the recesses,
the inner sides of the recesses face the lateral surfaces,
the frame is formed from a solid, dimensionally stable and thermally conductive material for controlling the temperature of the battery cells,
the inner sides of the recesses extend at least substantially over an entire length of the lateral surfaces of the battery cells in the vertical direction,
the gap filler is formed from a permanently deformable thermally conductive material,
a first electrical pole of each battery cell is arranged at one of the end sides,
the gap filler and the frame are formed from an electrically conductive material, and
a respective second electrical pole of each battery cell is electrically contacted by the gap filler.

2. The battery cell assembly according to claim 1, wherein:
the gap filler is formed from a material whose thermal conductivity decreases as a temperature increases.

3. The battery cell assembly according to claim 1, wherein:
the recesses are closed by cover elements on both sides in the vertical direction, and
the gap filler is formed from a material with an evaporation temperature of between 80° C. and 120° C.

4. The battery cell assembly according to claim 1, wherein:
the battery cell assembly has a first cell block and a second cell block which are each composed of a plurality of the battery cells,
the first electrical poles of the battery cells are electrically connected to one another by a cell connector of the respective cell block and accommodated in a respective frame of the cell block,
the frames of the cell blocks are spaced apart from one another by an electrical insulator, and
the cell connector of the first cell block is electrically connected to the frame of the second cell block via a connecting line, so that the cell blocks are electrically interconnected in series.

5. The battery cell assembly according to claim 1, wherein:
a plurality of dimensionally stable spacers are arranged between each of the battery cells and the inner wall of the respective recess, which inner wall surrounds the battery cells, and
the spacers are arranged in a manner distributed in a circumferential direction of the respective battery cell and are spaced apart from one another by regions which are filled with the gap filler.

6. The battery cell assembly according to claim 5, wherein the spacers are thermally conductive.

7. The battery cell assembly according to claim 5, wherein:
the spacers are formed from an electrically conductive material and contact an electrical pole of the respective battery cell.

8. A battery comprising:
a housing; and
at least one battery cell assembly according to claim 1, wherein the at least one battery cell assembly is arranged in the housing.

9. The battery according to claim 8, wherein the battery is a traction battery for a motor vehicle.

10. A motor vehicle comprising the battery according to claim 8.

11. A battery cell assembly, comprising:
a frame; and
a plurality of battery cells, each of which has two end sides which are situated opposite one another in a vertical direction and are connected by at least one lateral surface which extends in the vertical direction, wherein:
the battery cells are held in cell-specific recesses of the frame with vertical directions which are oriented at least substantially parallel to one another,
a respective gap filler, which connects the battery cells and the frame to one another, is arranged between the lateral surfaces and the inner sides of the recesses,
the inner sides of the recesses face the lateral surfaces,
the frame is formed from a solid, dimensionally stable and thermally conductive material for controlling the temperature of the battery cells,
the inner sides of the recesses extend at least substantially over an entire length of the lateral surfaces of the battery cells in the vertical direction,
a plurality of dimensionally stable spacers are arranged between each of the battery cells and the inner wall of the respective recess, which inner wall surrounds the battery cells, and
the spacers are arranged in a manner distributed in a circumferential direction of the respective battery cell and are spaced apart from one another by regions which are filled with the gap filler.

12. The battery cell assembly according to claim 11, wherein the spacers are thermally conductive.

13. The battery cell assembly according to claim 11, wherein:
   the spacers are formed from an electrically conductive material and contact an electrical pole of the respective battery cell.

14. The battery cell assembly according to claim 11, wherein:
   the gap filler is formed from an electrically insulating material,
   a respective first electrical pole of the battery cells is arranged at one of the end sides, and
   a respective second electrical pole of the battery cells is arranged at a respectively opposite end side and/or is electrically connected to the respectively opposite end side by a contacting device which is guided through the respective gap filler.

* * * * *